United States Patent [19]

Morin

[11] 3,998,254
[45] Dec. 21, 1976

[54] SAFE POWER MACHINE

[75] Inventor: Marius Joseph Morin, Torrance, Calif.

[73] Assignee: Mattel, Inc., Hawthorne, Calif.

[22] Filed: Mar. 3, 1975

[21] Appl. No.: 554,844

[52] U.S. Cl. ................... 144/35 R; 144/251 R; 83/440.2; 74/612; 51/5 B; 51/5 E; 408/25; 408/224

[51] Int. Cl.² ............... B27C 9/04; B27G 19/02; F16P 1/02

[58] Field of Search ............ 51/5 B, 5 E, 102, 116; 83/440.2, 444, 449, 450, 749, 750; 144/1 R, 1 A-1 D, 1 H, 35 R, 28.6, 251 R; 408/24, 25, 26, 28, 87, 91, 224; 74/612

[56] References Cited

UNITED STATES PATENTS

| 128,024 | 6/1872 | Cunningham | 83/749 X |
|---|---|---|---|
| 1,221,943 | 4/1917 | Wright | 74/612 X |
| 2,102,857 | 12/1937 | Schafer | 144/1 R |
| 2,451,733 | 10/1948 | Hochwarder | 408/91 X |
| 2,501,134 | 3/1950 | Meckoski | 144/35 R X |
| 2,506,610 | 5/1950 | Mueller | 144/251 R X |
| 2,707,854 | 5/1955 | Johnson | 51/102 X |
| 2,722,783 | 11/1955 | O'Russa | 51/102 |
| 2,786,373 | 3/1957 | Patton | 408/224 X |
| 2,944,374 | 7/1960 | Persson | 144/251 R X |
| 3,128,805 | 4/1964 | Silver | 144/1 C |
| 3,535,956 | 10/1970 | Gnoth | 408/87 |
| 3,750,724 | 8/1973 | Dahle | 144/28.6 X |
| 3,754,493 | 8/1973 | Niehaus | 144/251 R X |
| 3,769,855 | 11/1973 | Sebastian | 74/612 |

*Primary Examiner*—Gary L. Smith
*Attorney, Agent, or Firm*—Max E. Shirk; Stephen L. King; Robert W. Mulcahy

[57] ABSTRACT

A compact, multi-purpose power machine which can be safely used by children, including a housing with deep, narrow slots that prevent the insertion of a human finger therein, and cutting tools located within the slots so a child cannot touch them.

5 Claims, 6 Drawing Figures

SAFE POWER MACHINE

BACKGROUND OF THE INVENTION

This invention relates to power machines.

One of the potentially most interesting and educational toys for older children are power wood working machines. However, such machines are potentially extremely dangerous, not only for children, but for adults. Of course, numerous guards and safety attachments have been devised, but they still permit injury. If a power machine could be designed that permitted rapid machining of common materials and which prevented even intentional contact with the cutting tools, then the great benefit of power tools would become available to children and even to many adults who are reluctant to handle power tools.

SUMMARY OF THE INVENTION

In accordance with one embodiment of the present invention, a compact machine is provided which permits the rapid machining of sheets of wood and similar materials, and which is relatively safe for use by older children. The power machine includes a housing with several slots and includes power-driven tools located within the slots. The slots are narrow enough, generally no more than about one-quarter inch in thickness, so that a child cannot insert his finger into them and therefore cannot contact the tools. This thickness still permits the machining of sheets that are strong enough to construct many useful articles. At least the cutting tools are located deep enough within the slot so that a thin but short finger of a smaller child cannot reach them. The housing may be constructed of generally opaque material, but it includes windows of transparent material that permit a child to view the tools as they machine a workpiece.

In one power machine, the housing has a pair of horizontal slots that are vertically spaced from one another and which extend into opposite sides of the housing. The edge portion of a circular saw blade extends through one of the slots, while a jig saw blade extends through the other slot. The vertical spacing of the slots permits each slot to be deep so that a cut can be made far from either edge of a wood sheet, and yet a very wide housing is not required. The housing also has a slot at each end, a sanding disc lying at the bottom of one slot and a drill movable through the other slot. The drill apparatus includes a drill holder that can slide while it rotates on a shaft. The drill has three portions of different diameters to permit drilling of holes of three different sizes, each drill portion being slightly longer than the thickness of the slot. The housing includes a region at one side of the drill slot which receives the tip of the drill and prevents contact of a child with it.

The novel features that are considered characteristic of this invention are set forth with particularity in the appended claims. The invention will best be understood from the following description when read in connection with the accompanying drawings.

DESCRIPTION OF THE PREFERRED EMBODIMENTS

Figure 1:
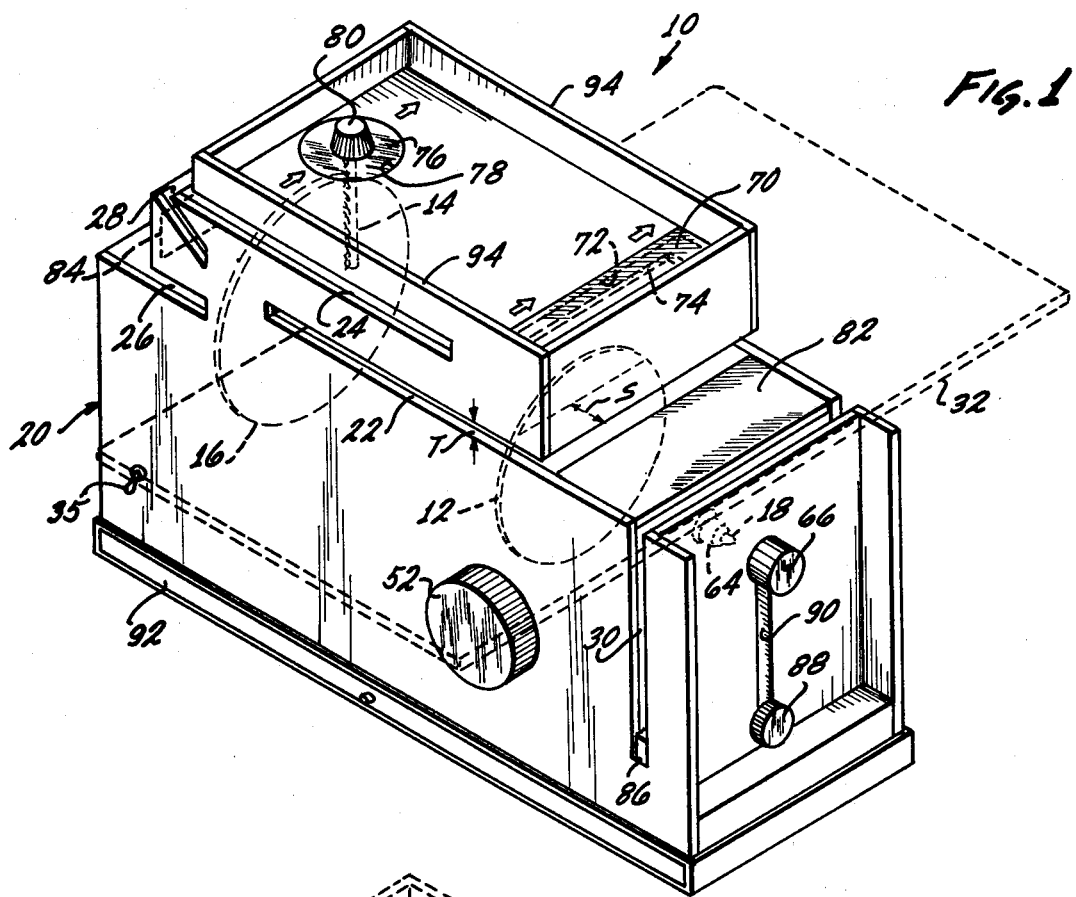
FIG. 1 is a front and right side perspective view of a safety power machine constructed in accordance with the invention.
Figure 2:
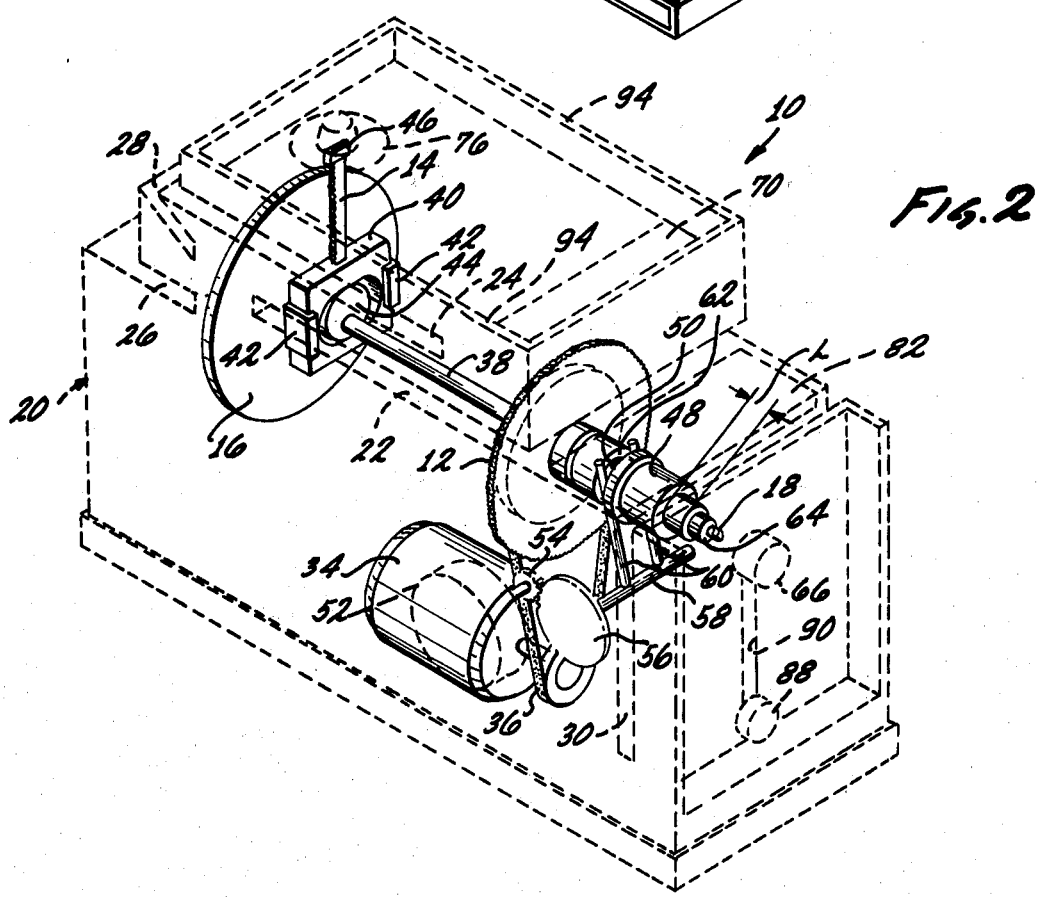
FIG. 2 is a perspective view of the machine of FIG. 1, showing the internal mechanisms thereof and indicating the housing only in phantom lines.
Figure 3:
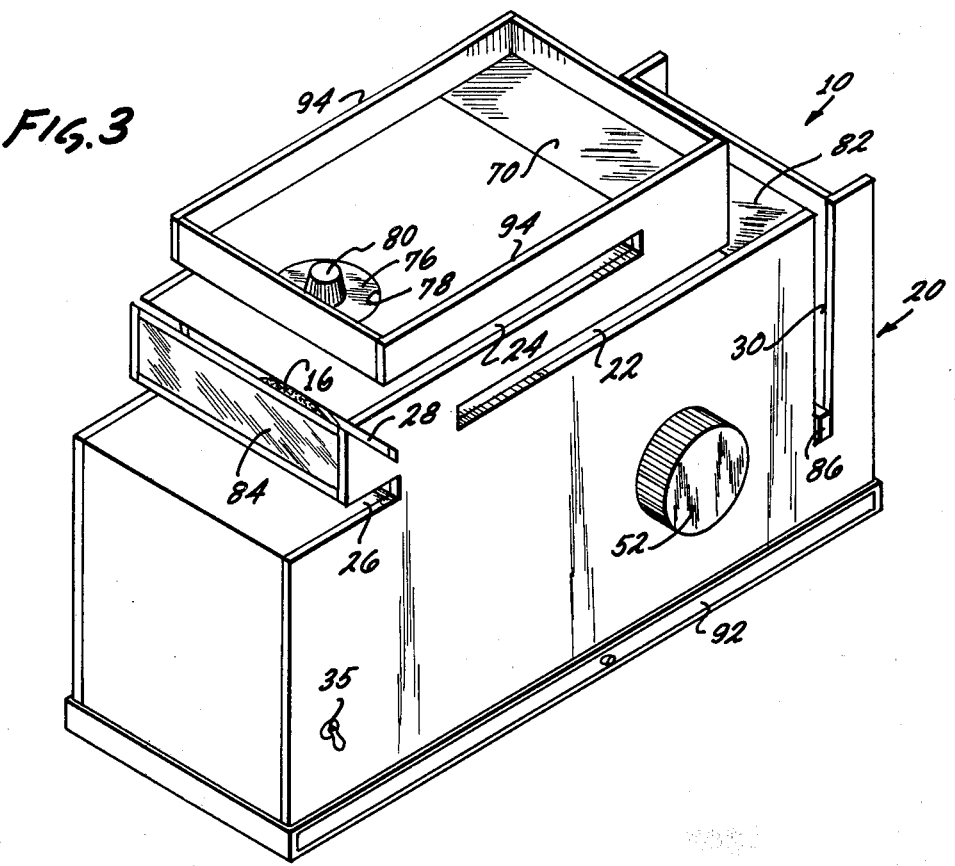
FIG. 3 is a front and left side perspective view of the power machine of FIG. 1.
Figure 4:
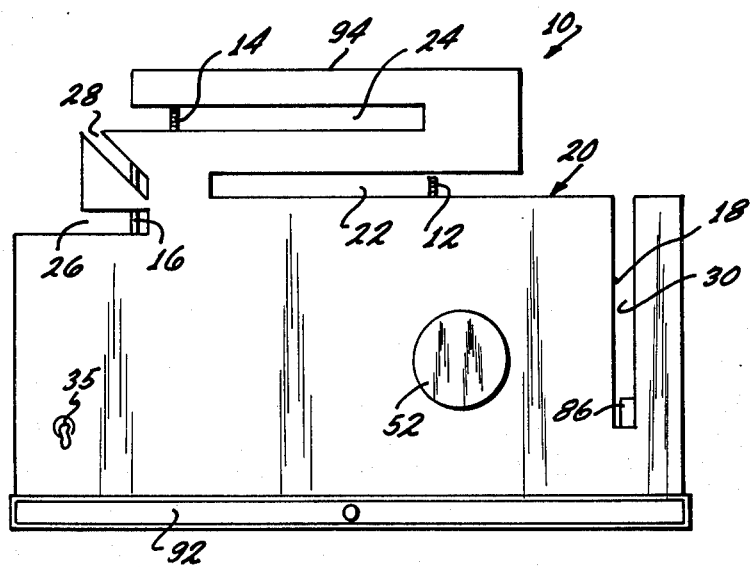
FIG. 4 is a front elevation view of the power machine of FIG. 1.
Figure 5:
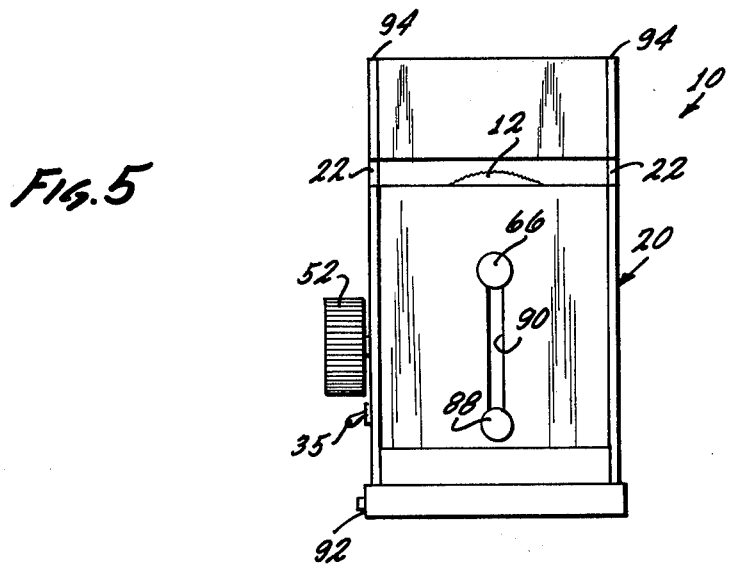
FIG. 5 is a right side elevation view of the power machine of FIG. 1.

FIGS. 1–5 illustrate a power machine 10 which can perform many machining operations on sheets of wood, plastic, or other easily machinable material, where the sheets are of up to a predetermined thickness such as one-quarter inch. The machine is designed so that it is relatively safe for use by older children and adults, the design preventing the fingers of the human operator from contacting any of the rapidly moving parts of the machine. The machine has four main tools, including a circular saw blade 12, a jig saw blade 14, a sanding disc 16, and a drill 18. The housing 20 of the machine is designed to prevent the operator from contacting any of these tools and yet to permit workpieces to be readily manipulated so they can be cut by the tools. In order to accomplish this, the housing is provided with several slots 22, 24, 26, 28 and 30, and the tools are located deep within these slots. A sheet of wood 32 can be inserted into any of these slots, but the fingers of the operator cannot be received in the slots, so that cutting of the fingers is prevented even if the operator is extremely careless.

The thickness T of the slots is chosen so that a child cannot insert even his little finger deeply into the slots. Although the thickness, or minimum cross-sectional dimension, of human fingers varies, the variation between different individuals is relatively small. Children tend to have fingers that are relatively thick compared to other dimensions of the child such as his height. The vast majority of older children have fingers that are more than one-quarter inch in thickness, so they cannot project deeply into a slot that is one-quarter inch in thickness. By making the thickness T of the slots no more than about one-quarter inch, children are prevented from moving their fingers into the slots and into contact with the tools. Provisions are also made to prevent a thin but short finger tip, which a very young child may have, from contacting a tool and especially from contacting the saws 12 and 14 which can cause serious injury. To prevent such contact, the tools, and particularly the saws 12 and 14, are located deep within the slots so the tip of a small finger cannot reach them even if the finger can enter the slot up to the first joint. The distance S between the surface of the housing where the slot opening lies, or in other words the entrance of the slot, and the cutting portion of any tool should be greater than the thickness T of the slot and is preferably greater than one inch. Where the slots are approximately one-quarter inch thick, sheets of wood or plastic of up to about one-quarter inch thickness can be machined. Such a thickness is sufficient for most articles that a child is likely to want to build, and is even sufficient for may projects which an adult may want to build. Thus, the limitation arising from the provision of slots does not greatly decrease the utility of the machine. In order to facilitate constructions of projects, sheets of wood or other material, such as the sheet 32, may be stocked for sale to children for use with the machine. If the power machine is designed for use by adults, the slots may have a thickness such as three-eights inch which prevents deep insertion of the fingers of almost every adult while permitting the machining of thicker wood.

The machine includes an electric motor 34 controlled by a switch 35 and energized through a cord (not shown) that can be plugged into an ordinary electrical outlet. The motor is coupled through a belt 36 to a main shaft 38 that drives the various tools. The circular saw 12 and sanding disc 16 are merely fixed to a cam follower 40 that is mounted in bearings 42 for vertical sliding. An eccentric cam member 44 fixed to the shaft 38 projects through a hole in the cam follower 40 and vertically oscillates the cam follower to drive the jig saw blade up and down. A slider bearing 46 near the tip of the blade slidably supports it.

The drill apparatus 18 includes a drill holder 48 that has internal splines (not shown) that are engaged with splines 50 formed on an end of the shaft 38, so that the drill holder 48 can slide along the axis of the shaft while rotating with the shaft. Sliding of the drill holder 48 is controlled by manual turning of a knob 52 rotatably mounted on the housing. The knob 52 is fixed to a gear 54 that turns another gear 56 which is fixed to a shaft 58. A pair of rods 60 fixed to the shaft extend through a groove 62 formed in the drill holder. When the knob 52 is turned by a child, the rods 60 cause the drill holder to slide along the shaft while it is rapidly rotated by the shaft.

The drill holder 48 holds a drill 64 that has three portions of different diameters for drilling holes of three different diameters. Each of the drill portions has a length L which is slightly greater than the thickness T of the slot, so that a hole of uniform diameter can be drilled completely through a sheet of material held in the slot. When a hole of largest diameter is to be drilled, the tip of the drill 64 moves through the slot 30 and a substantial distance beyond. In order to prevent a child from contacting the tip of the drill, the housing is provided with a portion 66 that forms a recess for receiving the drill, the portion 66 enclosing the region opposite the drill so that a child cannot make contact with the drill.

The housing 20 may be constructed of a variety of materials, including metals and plastics. Many of the most suitable materials are opaque, and opaque materials are generally preferable for most of the housing to enhance its appearance. However, the use of narrow slots and the mounting of the tools deep within the slots could hamper effective machining by preventing a child from viewing the portion of the workpiece being machined. To eliminate this problem, the housing is provided with several windows that permit a child to view the portion of the workpiece being machined so that he can more accurately manipulate the workpiece. A transparent member 70 is mounted in a hole 72 of the housing over the circular saw blade 12 to permit a child to view at least the portion of the workpiece that is being cut by the saw. The housing also has a second hole 74 located beneath the upper hole 72 to provide an unobstructed view of the blade. The jig saw blade 14 can be viewed through a transparent member 76 that is mounted in a hole 78 of the housing. A projecting bearing holder 80 is mounted at the center of the window member 76 to hold the slide bearing 46 that slidably holds the jig saw blade. The drill apparatus 18 can be viewed through a transparent window member 82 that is mounted above the drill holder 48 and which extends in a plane parallel to the axis of the shaft 38 up to one side of the slot 30. The sanding disc 16 can be viewed through a window 84 that extends across one side of the housing. Thus, although the machine tools are accessible only through narrow slots, accurate machining can be performed because transparent windows permit the operator to view the portion of the workpiece being machined.

The machine includes several features that facilitate its use. A stop member 86 is provided which extends across the drill slot 30 to help position a workpiece for drilling. The stop 86 is threadably engaged with a nut 88 which includes a threaded shank (not shown) that engages a threaded hole on the stop member 86. When the nut 88 is loosened, it can slide along a slot 90 formed in the housing to slide the stop 86 to a different position along the drill slot. A dust pan 92 is provided that slides like a drawer into the bottom of the housing 20. The pan 92 lies below all of the tools and covers nearly all of the dust resulting from machining. The pan 92 can be occasionally pulled out and emptied into a waste basket to dispose of the sawdust.

Figure 6:
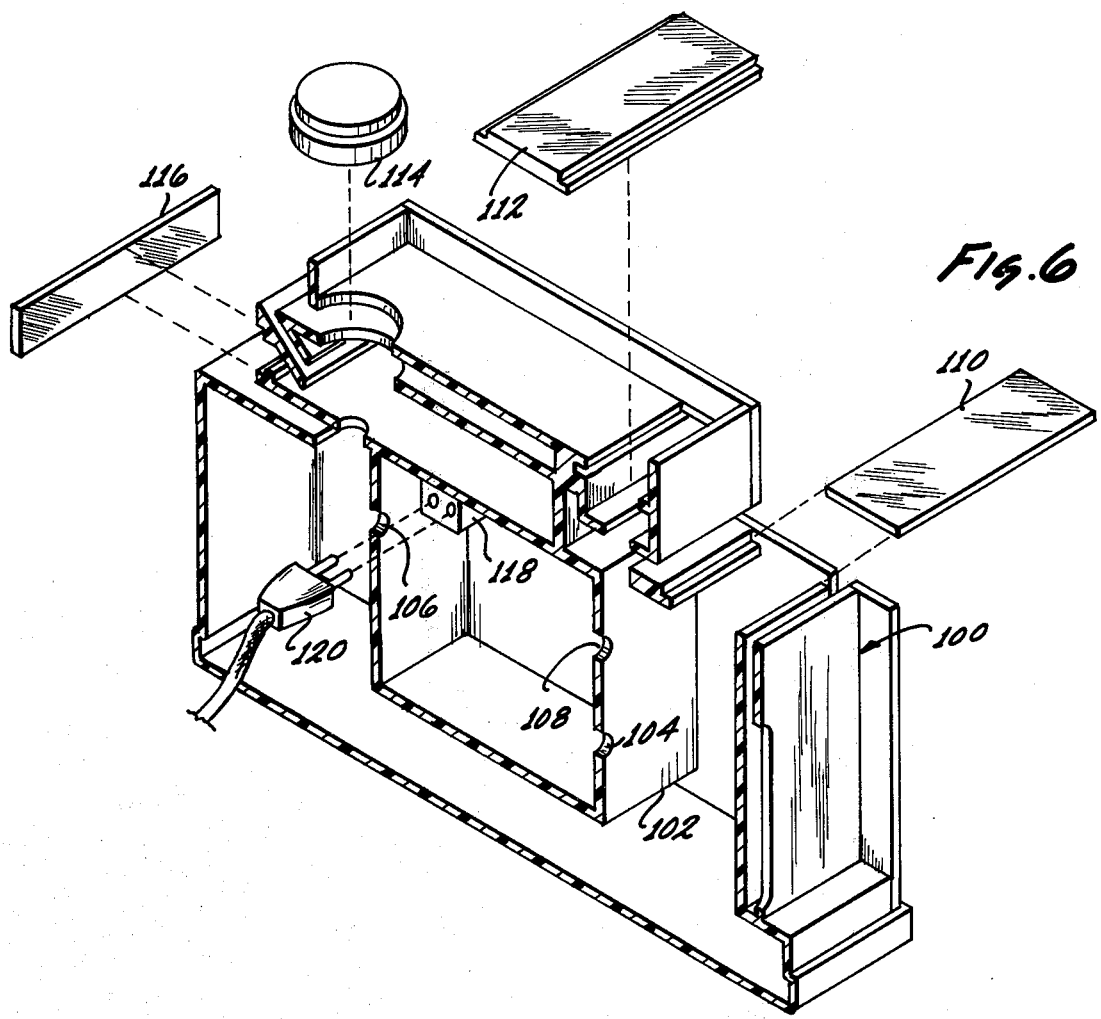
FIG. 6 is a perspective view of a housing portion of a power machine constructed in accordance with another embodiment of the invention.

The housing 20 of the machine of FIG. 1 is formed of thin sheets of structural material, such as steel. The overhanging portions formed above the jig saw slot 24 and circular saw slot 22 have tall beam portions 94 for strengthening them. Another design of a housing is illustrated in FIG. 6 which is adapted for construction by injection molding of plastic. FIG. 6 illustrates only one part 100 of the housing, the other part being substantially the mirror image of the part 100. The housing part 100 includes an enclosure 102 which holds the motor, to provide a substantially sawdust-free environment for the motor, with only the shaft of the motor projecting through an opening 104. The shaft on which the various machining tools are mounted projects through holes 106, 108 which carry bearings. Four window members, 110, 112, 114 and 116, that are constructed of transparent material can be installed in the housing to permit viewing of the workpiece portion that is being machined. The housing is designed so that it can be disassembled for replacement of worn tools. An electrical interlock is provided to prevent energization of the motor when the housing is taken apart. The interlock includes a socket 118 mounted on the housing part 100 and connected to the motor, and a plug 120 that is mounted on the other housing part and which is connected to a cord that has a plug that can be connected to a household outlet. The two connector parts 118, 120 are necessarily separated when the housing parts are separated, so that the motor cannot be energized.

Thus, the invention provides a power machine that is relatively safe for use by older children and adults, and which permits effective machining. This is accomplished by providing a housing that encloses the machining tools and which permits access to them only through narrow slots that are too narrow for the deep insertion of a human finger. Generally, slots of a thickness of approximately one-quarter inch prevent insertion of the fingers of a child. Extra protection can be obtained to prevent a very young child from contacting a machining tool, and particularly a cutting tool such as a circular or jig saw that can produce severe injuries, by placing the cutting tools deep in the slots so they lie at least about one inch from the open ends of the slots. The machine can be provided with many tools for performing a variety of machining operations, and yet can be made compact by properly arranging the tools and housing. The provision of a circular saw for straight cutting and a narrow saw, such as a jig or scroll type is made without requiring a large housing, by vertically spacing the slots through which these two types of saws extend, so that portions of one slot lie over portions of the other slot. Accurate machining is made possible by providing transparent members that form windows through which the operator can view the portion of the workpiece being machined. A simple drilling apparatus is provided which can drill holes of a plurality of diameters by utilizing drill portions of different diameters that are all held on a single drill holder. The different drill portions are each longer than the thickness of the slot, so that a hole of any one of the diameters can be drilled completely through a sheet of material.

Although particular embodiments of the invention have been described and illustrated herein, it is recognized that modifications and variations may readily occur to those skilled in the art and consequently it is intended that the claims be interpreted to cover such modifications and equivalents.

What is claimed is:

1. A safe power machine comprising:
    a housing with walls forming a first slot having a thickness of no more than about three-eights inch at the surface of the housing to prevent the deep entrance of a human finger therein, said first slot extending substantially horizontally, said housing having a second slot substantially parallel to and vertically spaced from said first slot, a portion of one of said slots lying directly over the other slot and said slots extending into said housing from opposite sides of the housing;
    a motor mounted in said housing;
    a first machining tool drivingly coupled to said motor and located within said slot,
    said first machining tool including a saw with an upper portion extending through said first slot; and
    a second machining tool drivingly coupled to said motor and located within said second slot.

2. A safety power machine comprising:
    a housing having fixed walls forming a slot of a thickness of less than three-eights inch along the outside of the housing;
    a motor mounted in said housing;
    a cutting tool coupled to said motor to be rotated by it, said cutting tool extending through said slot to cut plates of material inserted into the slot, all rotating cutting surfaces of said tool which lie in said slot being spaced from the open edges of the slot by a distance at least equal to the thickness of the slot;
    a shaft driven by said motor, said cutting tool comprising a circular saw blade fixed to the shaft;
    a sanding disc fixed to said shaft at a location spaced from the saw blade; and
    a second slot provided in said housing, said second slot being less than three-eights inch in thickness and extending perpendicular to the shaft, said sanding disc being located at the bottom of said second slot.

3. A safety power machine comprising:
    a housing having a pair of vertically spaced slots extending substantially horizontally into opposite sides of the housing;
    a shaft rotatably mounted in said housing below said slots;
    a circular saw blade fixed to said shaft and having an edge portion extending across a first of said slots; and
    an elongated narrow saw coupled to said shaft to be moved by it, said narrow saw extending through a second of said slots.

4. The power machine described in claim 3 wherein:
    said housing forms a third slot at one side of the housing and extending parallel to said pair of slots; and including
    a sanding disc fixed to said shaft and located near the bottom of said third slot.

5. The power machine described in claim 3 wherein:
    said housing forms a third slot at one side of the housing and extending perpendicular to said pair of slots; and including
    spline means formed at an end of said shaft;
    a drill assembly slidably mounted on said shaft and engaged with said spline means, said assembly including a drill with a tip that is movable across said third slot when the assembly slides; and
    manually operable means for sliding said drill assembly;
    said housing including walls forming a drill-receiving recess on the side of the third slot opposite the shaft, for receiving the drill tip and prevent contact of an operator therewith.

* * * * *